May 12, 1953     R. A. RAILTON     2,638,014
STEERING MECHANISM FOR MOTOR VEHICLES
Filed Oct. 3, 1950     2 Sheets-Sheet 2
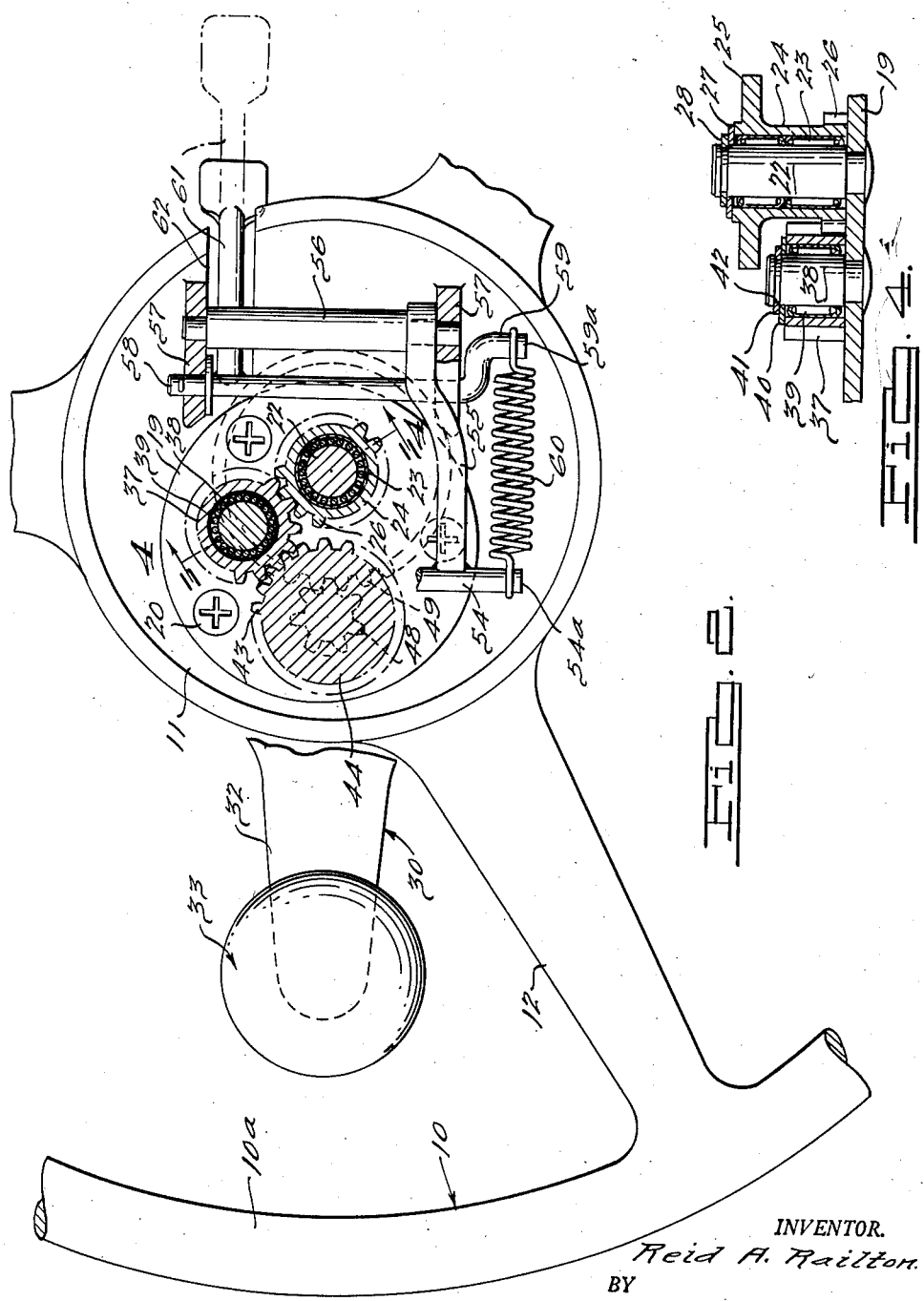
INVENTOR.
Reid A. Railton.
BY
Elmer Jamison Gray
ATTORNEY.

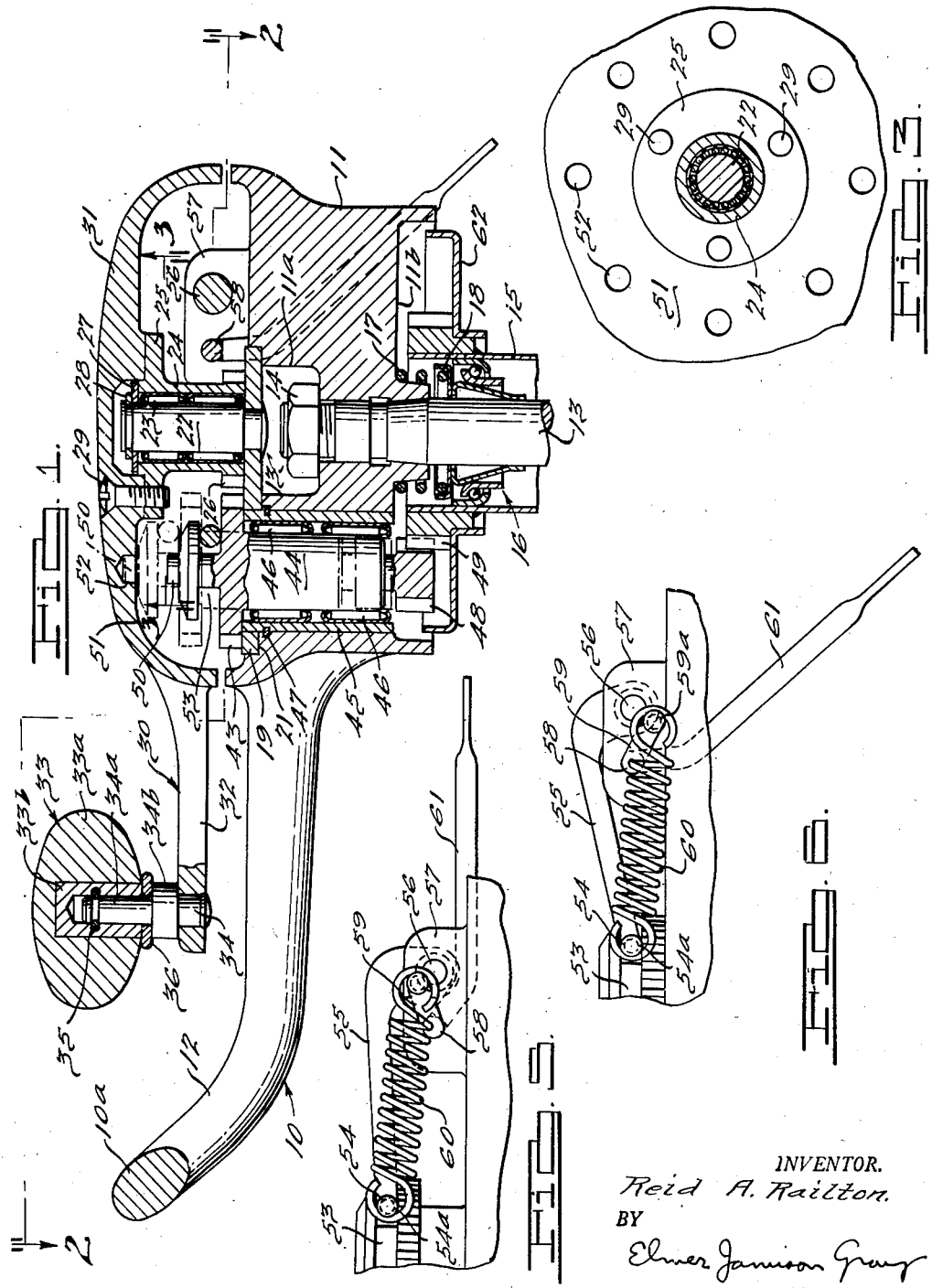

Patented May 12, 1953

2,638,014

UNITED STATES PATENT OFFICE 2,638,014

STEERING MECHANISM FOR MOTOR VEHICLES

Reid A. Railton, Berkeley, Calif., assignor to Hudson Motor Car Company, Detroit, Mich., a corporation of Michigan Application October 3, 1950, Serial No. 188,217

11 Claims. (Cl. 74—498)

This invention relates to steering gear for vehicles, particularly motor vehicles, an object of the invention being to provide an improved steering gear mechanism which is characterized by the provision of means by which the vehicle operator may obtain increased steering leverage to turn the vehicle wheels when the resistance to such turning movement is high, as when the vehicle is at a standstill.

The ratio between the angular movement of the steering wheel and the resulting angular movement of the steering swivels is in present day practice a compromise ratio. Maximum ease of handling of the vehicle when in motion calls for a ratio of about 18 to 1, i. e., 18 degrees of angular movement of the steering wheel resulting in 1 degree of angular movement of the steering swivels. Present day low pressure tires create a high degree of frictional resistance to turning movement of the wheels when the vehicle is at a standstill and in order that the wheels can be turned without requiring excessive bodily effort a ratio of about 50 to 1 is desirable. However, a ratio of 50 degrees of angular movement of the steering wheel to 1 degree of angular movement of the steering swivels would make the vehicle unmanageable when in motion since the turning rate would be too slow. Therefore, a compromise ratio is selected, the average being about 25 to 1. This is not ideal as it makes the wheel hard to turn when maneuvering into or out of a parking space and yet does not provide maximum maneuverability when the vehicle is in motion.

An object of this invention is to provide the vehicle operator with at least two alternative steering gear ratios, a high ratio for use when the vehicle is in motion and a low ratio for maneuvering the vehicle into or out of a parking space or when driving through sand or mud. In the present invention the high ratio is provided by the regular steering wheel which operates the usual steering gear mechanism in the usual manner. The low ratio is provided by an auxiliary steering device, preferably a hand crank provided with a freely swivelling knob, mounted above and coaxially with the steering wheel, which drives the steering wheel through reduction gearing so arranged that several turns of the crank are required to turn the steering wheel through one revolution. The mechanical advantage resulting from the use of the reduction gearing arrangement thus enables the wheels to be turned with much less bodily exertion.

The gearing connecting the hand crank with the steering wheel is arranged so that it is engageable and disengageable by the movement of a small control lever preferably mounted beneath the steering wheel. When this lever is in the "disengaged" position, the hand crank is locked directly to the steering wheel and can be used for steering the car if desired. Whenever it becomes necessary to operate the steering gear with the vehicle stationary or moving at a very slow speed, as when parking, movement of the control lever to the "engaged" position will connect the crank arm to the steering wheel through the reduction gearing, whereupon the road wheels can be turned with comparatively little effort by turning the crank handle instead of the steering wheel. When the increased mechanical advantage is no longer required, the control lever can be returned to the "disengaged" position, thus once again directly locking the crank handle to the steering wheel.

For all ordinary driving it is desirable that the control lever be kept in the disengaged position. However, it should be noted that the steering wheel is at no time disconnected from the steering mechanism, and can be used in the ordinary way regardless of the position of the control lever.

Further details and objects of the particular embodiment of the invention herein illustrated will appear in the following description, reference being had to the accompanying drawings forming a part of this specification wherein like reference numerals designate corresponding parts in the several views.

Fig. 1 is a sectional elevation of the auxiliary steering gear mechanism constructed in accordance with this invention.

Fig. 2 is a section taken substantially through lines 2—2 of Fig. 1 looking in the direction of the arrows.

Fig. 3 is a fragmentary section taken substantially through lines 3—3 of Fig. 1 looking in the direction of the arrows.

Fig. 4 is a section taken through lines 4—4 of Fig. 2 looking in the direction of the arrows.

Figs. 5 and 6 are fragmentary elevational views illustrating the "disengaged" and "engaged" positions, respectively, of the control lever.

Before explaining in detail the present invention it is to be understood that the invention is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the present invention as applied to an automobile. Referring to Figs. 1 and 3, the steering wheel 10 therein shown comprises a rim 10a connected to a central boss or hub 11 by means of arms or spokes 12. The central boss or hub 11 is bored and counterbored to receive the upper end of a steering tube 13. As is shown in Fig. 1, the steering tube 13 is threaded on its upper end 13a and projects into the counterbored portion 11a of the hub 11. A nut 14 engages the threaded end 13a of the steering tube and retains the steering wheel thereon. The steering tube 13 is turnably mounted within a steering column 15 and is rotatably and concentrically maintained therein by ball bearing means, generally designated 16. A compression spring 17 is interposed between the base 11b of the hub 11 and a spring retainer 18, which abuts the upper portion of the ball bearing assembly 16, to prevent upward shifting of the ball bearing assembly due to vehicular vibrations.

The lower end of the steering tube is connected to the usual gear case and members necessary to connect the latter to the front wheels, such as the steering gear arm, connecting rod, tie rod, knuckle arms and knuckles. These members are not shown and a further detailed description is not deemed necessary herein as the construction and arrangement thereof forms no part of the present invention.

The mechanism embodied in the present invention is constructed and arranged so that it is confined to a small space at the top of the steering column. A circular mounting plate 19 of a diameter substantially less than the diameter of the steering wheel hub or boss 11 is rigidly fastened by means of screws 20 within a circular recess 21 in the upper surface of the steering wheel boss. The center of the circular recess 21, and therefore the center of the mounting plate 19, is laterally displaced from the axis of the steering tube 13. A non-rotatable spindle 22 is secured to the mounting plate 19, projects upwardly therefrom, and is positioned so that its longitudinal axis is concentric with the longitudinal axis of the steering tube 13.

Rotatably mounted on needle bearings 23 surrounding the spindle 22 is a tubular shaft 24 having an annular flange 25 at its upper end and an integral gear wheel 26 at its lower end, see Figs. 1 and 4. The shaft 24 is retained on the spindle 22 by a washer 27 and a snap ring 28.

Fastened to the annular flange 25 by means of screws 29 is the hub 31 of a crank handle 30 having an arm 32 extending outwardly toward the steering wheel rim 10a. The hub 31 is substantially hollow on the under side thereof to provide space for various elements of the mechanism embodied in the present invention which are carried on the top of the steering wheel boss or hub 10. The hub 31 is, in effect, a cover concealing such mechanism. The free end of the crank handle arm 31 has a hand knob 33 mounted on a spindle 34 which is rigidly fastened to the crank arm. The knob 33 is preferably freely rotatable on the spindle 34 and is secured thereto in any convenient manner. As illustrated in Fig. 1, the knob 33 comprises a body member 33a made of a composition material, such as plastic, having a metal insert 33b therein. The metal insert is bored out to receive the reduced end 34a of the spindle 34 and both the insert and the spindle are grooved to receive a snap ring 35 which holds the knob 33 on the spindle 34. An ornamental washer 36 is inserted between the base of the knob 33 and the shoulder portion 34b of the spindle.

From the foregoing it will be understood that the crank handle 30 is rotatable about the longitudinal axis of the steering tube 13 since the axis of the spindle 22 about which the crank handle rotates is concentric with the steering tube axis.

As will be hereinafter further explained, the present invention concerns the transmittal of the rotative movement of the crank handle 30 to the steering wheel 10 and the steering tube 13, either in a direct one to one ratio or in a ratio wherein one revolution of the crank handle 30 will result in a lesser number of degrees of angular movement of the steering wheel and will result in a corresponding increase of turning leverage.

As has been previously stated, the shaft 24 rotatably mounted on the spindle 22 has integral therewith at its lower end the gear wheel 26. As best seen in Figs. 2 and 4, the gear wheel 26 meshes with an axially elongated idler gear 37 rotatably mounted on a spindle 38 rigidly secured to the mounting plate 19. The gear 37 is rotatable about the spindle 38 on needle bearings 39 and is secured against longitudinal displacement by a washer 40 and a snap ring 41, the snap ring 41 being seated in a groove 42 at the upper end of the spindle 38.

The idler gear 37 in turn meshes with a gear 43 formed integrally with the upper portion of a shaft 44, Figs. 1 and 2. The shaft 44 is mounted for rotative and slidable movement within a sleeve 45 carried within aligned holes in the mounting plate 19 and the steering wheel boss or hub 11. Needle bearings 46 are interposed between the inner wall of the sleeve 45 and the shaft 44. The sleeve 45 is held against longitudinal displacement relative to the hub 13 and the mounting plate 19 by means of a snap ring 47 seated in opposed grooves in the wall of the bore in the hub 11 and the outer wall of the sleeve 45.

The lower end of the shaft 44 also has a gear 48 formed integrally therewith which gear 48 meshes with a gear 49 which is rigidly fastened to the outer shell of the steering column 15. Since the steering column 15 is rigidly fixed to the vehicle frame the gear 49 is non-rotatable. Rotation of the gear 48 will result in that gear traveling in an orbital path around the periphery of gear 49. Since gear 48 is carried in the hub 11 of the steering wheel, the steering wheel 10 and steering tube 13 will be rotated about the axis of the steering tube causing turning movement of the steering swivels.

The relationship of the gears in the gear train comprised of gears 26, 37, 43, 48, and 49 is such that several complete revolutions of the crank handle 30 which is directly connected to the driving gear 26 are required to obtain one complete revolution of the steering wheel and the steering tube 13.

Shaft 44 in addition to being rotatable within its bearings 46 is also slidable axially in them. Means is provided for sliding shaft 44 upward in the bearings 46, the effect of such sliding being that after a certain degree of upward movement is reached gear 48 is disengaged from gear 49 thus rendering the crank handle 30 ineffective upon rotation thereof to cause rotation of the steering wheel 10 and the steering tube 13 through the gear train. Further upward movement of shaft 44 will result in a projection 50 on the end thereof abutting the under side 51 of the crank handle boss.

The underside 51 of the boss 31 is provided with a series of circumferentially spaced holes 52, see Fig. 3, any one of which is adapted to receive therein the projection 50 on the shaft 44 and thereby lock the crank handle 30 in direct turning ratio to the steering wheel 10 and steering tube 13. The shaft 44 in this instance functions as a pin coupling the crank handle boss 31 to the steering wheel boss 11.

The means for axially sliding the shaft 44 comprises a spring loaded toggle mechanism acting on a lever arm operatively connected to the upper end of the shaft 44. At its upper end immediately above the integral gear 43 the shaft 44 has a deep circumferential groove 53 which is engaged by a rod or finger 54 carried on one end of a lever arm 55, the longitudinal axis of the finger 54 being transverse to the longitudinal axis of the lever. The other end of the lever arm 55 is mounted on one end of a shaft 56 journalled in two spaced apart brackets 57 mounted on the upper surface of the steering wheel hub or boss 11.

Also journalled in the brackets 57 is a second shaft 58, this shaft running parallel to shaft 56, being located in substantially the same horizontal plane as the latter, and being interposed between the latter and the axis of the hub 11. The shaft 58 has a crank handle 59 thereon which projects beyond the end of the shaft 56 on which the lever arm 55 is mounted. A tension spring 60 is stretched between the end 59a of the crank handle 59 and one end 54a of the finger 54 carried on the end of the lever arm 55.

The shaft 58 has securely fastened thereto a control lever 61 which extends outwardly beyond the circumference of the steering wheel hub 11 through a suitable slot 62 therein.

Figs. 5 and 6 illustrate the "disengaged" and "engaged" positions, respectively, of the control lever 61. The terms "disengaged" and "engaged" refer to the position of the shaft 44 and the gear 48 thereon with respect to the gear 49. That is, when the control lever 61 is in the position shown in Fig. 5, the shaft 44 is in the up position, as shown in dotted outline in Fig. 1 and the gear 48 is not in mesh with and "disengaged" from the gear 49 fastened to the steering column 15. With the control lever 61 as shown in Fig. 5, the spring 60 exerts an upward force on the end of the lever arm 55. Thus, even if the projection 50 does not seat in a hole 52 immediately upon being raised into abutting relation to the underside 51 of the crank hub 31, the projection will enter the first hole passing over it under urging of the spring.

When the control lever is in the position shown in Fig. 6, the gear 48 is in mesh or "engaged" with gear 49 and rotation of the crank handle 30 will cause rotation of the steering wheel 10 through the reduction gear train comprised of gears 26, 27, 43, 48 and 49. With the control lever positioned as shown in Fig. 6, the spring 60 exerts a downward force on the lever arm 55 ensuring that the gears 48 and 49 are maintained in meshed or "engaged" relation.

A shield member 62 having a diameter slightly less than the diameter of the hub 11 of the steering wheel 10 is fastened to the underside of gear 49 to conceal that portion of the mechanism exposed on the underside of the hub.

In operation with the vehicle in motion, the control lever 60 will be normally kept in the up position shown in Fig 5. When the control lever is in the up position the hand crank 30 will be locked to the steering wheel 10 through the shaft 44 which in this case acts as a pin locking the hand crank hub 31 to the steering wheel hub 11. Under the above condition, either the steering wheel 10 or the hand crank 30 may be used to steer the vehicle since turning movement of either will give the same steering ratio.

If the vehicle operator desires increased steering leverage, he need only place the control lever 60 in the position shown in Fig. 6. By so doing the shaft 44 is moved downwardly into a position in which the gear 48 at the lower end thereof is placed into mesh with the gear 49 fixed to the steering column. Rotation of the crank handle 30 in this case results in the steering tube 13 being rotated at a reduced rate, since it is being driven through a reduction gear train comprised of gears 26, 27, 43, 48 and 49. The reduction may be, for example, as great as 6 to 1. That is, six turns of the crank handle are required to produce one complete revolution of the steering tube 13. Although the turning rate will be greatly reduced, the bodily effort necessary to turn the crank handle 30 will be much less than if the crank handle were coupled directly to the steering tube because of the greater mechanical advantage obtained by the use of the reduction gearing.

Present day low pressure tires create a high resistance to turning movement when the vehicle is at a standstill or moving very slowly as when being maneuvered into or out of a parking space. When being so maneuvered a fast turning rate is not material to safe operation of the vehicle. The fast turning rate becomes secondary to the desirability of increased leverage in the steering gear so that the road wheels can be turned easily.

It is to be noted that even though the hand crank 30 is connected to drive the steering tube 13 through the reduction gearing, the regular steering wheel is not in any way disconnected from the steering tube nor is there any change in the steering ratio obtained by use of the regular steering wheel.

I claim:

1. In a vehicular steering mechanism, a steering column, a steering member rotatably mounted within said steering column, a steering device having its hub rigidly mounted on said steering member, a gear train rotatably mounted on said hub, a non-rotatable gear rigidly mounted on the steering column, said gear train having one gear thereof operatively engageable with said non-rotatable gear, manually operable means exclusive of said steering device for driving said gear train to cause said one gear to rotate about the periphery of said non-rotatable gear and thereby rotate said hub and said steering member, said gear train having a coupling member shiftable in one direction to disengage said one gear from said non-rotatable gear and to couple said manually operable means directly to said hub, and a second manually operable means for shifting said coupling member.

2. In a vehicular steering mechanism, a steering column, a steering member rotatably mounted within said steering column, a steering device having its hub rigidly mounted on said steering member, a gear train mounted on said hub, a non-rotatable gear rigidly mounted on the steering column, said gear train having one gear thereof operatively engageable with said non-rotatable gear, manually operable means exclusive of said steering device for driving said gear train to cause said one gear to travel in an orbital path around said non-rotatable gear and thereby rotate said hub and said steering member, and a second manually operable means for selectively engaging said one gear with and disengaging it from said non-rotatable gear.

3. In a vehicular steering mechanism, a support, a steering shaft rotatably mounted in said support, a steering wheel hub rigidly mounted on said steering shaft, a mounting plate rigidly fastened to said hub, a non-rotatable gear rigidly mounted on said support, reduction gear means rotatably mounted on said plate and having one gear operatively engageable with said non-rotatable gear, a manually operable member rotatably mounted on said mounting plate and operatively connected to said reduction gear means to drive the same to rotate the steering shaft relatively to the support, and manually operable means for selectively engaging or disengaging said one gear with said non-rotatable gear.

4. In a vehicular steering mechanism, a steering column, a steering shaft rotatably mounted within said steering column, a steering device having a hub rigidly mounted on said steering shaft, a non-rotatable gear mounted on said steering column, gear train means mounted on said hub and having one gear thereof operatively engageable with said non-rotatable gear, manually operable means for driving said gear train to cause said one gear to travel in an orbital path with respect to said non-rotatable gear, means for mounting said one gear for axial movement, and a second manually operable means for shifting said gear axially into and out of operative engagement with said non-rotatable gear.

5. In a vehicular steering mechanism, a steering column having a non-rotatable gear rigidly mounted thereon, a steering shaft mounted to rotate within said steering column, a steering member having its hub rigidly mounted on said steering shaft, a second steering member, means rotatably mounting said second member on said hub, reduction gear means mounted on said hub including a driving gear connected to said second steering member for rotation therewith and a driven gear operatively engageable with said non-rotatable gear, means for mounting said driven gear for axial movement into and out of engagement with said non-rotatable gear, and manually operable means for axially moving said driven gear.

6. In a vehicular steering mechanism, a steering column having a non-rotatable gear rigidly mounted thereon, a steering shaft mounted to rotate within said steering column, a steering member having its hub rigidly mounted on said steering shaft, a second steering member, means rotatably mounting said second member on said hub, reduction gear means mounted on said hub including a driving gear connected to said second steering member for rotation therewith and a driven gear operatively engageable with said non-rotatable gear, means mounting said driven gear for axial movement including a member shiftable in one direction to disengage said driven gear from the non-rotatable gear and to couple said second steering member to said hub in a direct drive relationship, and manually operable means for shifting said shiftable member.

7. In a vehicular steering mechanism, a tubular support, a steering shaft mounted coaxially therewith, a steering wheel secured to said shaft for rotating the same, a manually rotatable steering member, reduction gearing interposed between said steering member and steering wheel to cause rotation of the latter at a reduced ratio upon rotating said steering member, and manually operable means for rendering said reduction gearing inoperative and including means for coupling said steering member and steering wheel in a direct drive ratio.

8. In a vehicular steering mechanism, a tubular support, a steering shaft mounted coaxially therewith, a steering wheel secured to said shaft for rotating the same, a manually rotatable steering member, reduction gearing interposed between said steering member and steering wheel to cause rotation of the latter at a reduced ratio upon rotating said steering member, a non-rotatable gear on said tubular support, said reduction gearing including a gear meshing with said non-rotatable gear, and manually operable means for disengaging said gear and non-rotatable gear and including means for coupling said steering member and steering wheel in a direct drive ratio.

9. In a vehicular steering mechanism, a tubular support, a steering shaft mounted coaxially therewith, a steering wheel secured to said shaft for rotating the same, a manually rotatable steering member, reduction gearing interposed between said steering member and steering wheel to cause rotation of the latter at a reduced ratio upon rotating said steering member, a non-rotatable gear on said tubular support, said reduction gearing including a gear meshing with said non-rotatable gear and movable in an orbital path therearound upon operation of said reduction gearing, means for shifting said gear out of mesh with said non-rotatable gear, and means for coupling said steering member and steering wheel in a direct drive ratio.

10. A vehicular steering mechanism, a steering shaft connected with said mechanism, a steering wheel drivingly connected to said shaft, a steering member, reduction gearing adapted to connect said steering member and steering wheel and when so connected being adapted to cause rotation of the steering wheel at a lesser turning ratio than said steering member upon rotation of the latter, means for rendering said reduction gearing inoperative, and means for coupling said steering member and steering wheel in a direct drive ratio when said reduction gearing is inoperative.

11. A vehicular steering mechanism, a manually operated rotatable steering control device connected with said mechanism and having hand grip means, a second manually operated rotatable steering control device also having hand grip means, and speed reduction means including shiftable means shiftable to one position to connect said devices to rotate the first at reduced speed upon rotation of the second and shiftable to another position to connect said devices in direct drive relationship.

REID A. RAILTON.

References Cited in the file of this patent

UNITED STATES PATENTS

| Number | Name | Date |
| --- | --- | --- |
| 756,670 | Marr | Apr. 5, 1904 |
| 1,389,267 | Norton | Aug. 30, 1921 |
| 1,425,678 | Newhouse | Aug. 15, 1922 |
| 1,534,356 | Burke | Apr. 21, 1925 |
| 1,562,070 | Baltzley | Nov. 17, 1925 |
| 1,636,233 | Kasch | July 19, 1927 |
| 1,909,330 | Banker | May 16, 1933 |
| 2,463,314 | Vogel | Apr. 26, 1949 |
| 2,522,694 | Vogel | Sept. 19, 1950 |

FOREIGN PATENTS

| Number | Country | Date |
| --- | --- | --- |
| 322,841 | Great Britain | Dec. 19, 1929 |
| 605,976 | France | June 4, 1926 |